United States Patent [19]

Mouret

[11] Patent Number: 4,649,812

[45] Date of Patent: Mar. 17, 1987

[54] TYING MECHANISM FOR ROLLED BALES IN A HAY BALER

[75] Inventor: Patrick Mouret, Mardie, France

[73] Assignee: Rivierre Casalis, Orleans, France

[21] Appl. No.: 812,998

[22] Filed: Dec. 24, 1985

[30] Foreign Application Priority Data

Jan. 25, 1985 [FR] France .................. 85 01032

[51] Int. Cl.$^4$ ............................................ B65B 13/18
[52] U.S. Cl. ............................................ 100/5; 100/13
[58] Field of Search .................. 100/5, 13, 88; 56/341, 56/342, 343

[56] References Cited

U.S. PATENT DOCUMENTS

| 2,971,455 | 2/1961 | Wade et al. | 100/5 |
| 3,064,556 | 11/1962 | Luebben. | |
| 4,248,143 | 2/1981 | Gaeddert | 100/5 |
| 4,505,197 | 3/1985 | Shenberger | 100/5 |

FOREIGN PATENT DOCUMENTS 2620807 11/1977 Fed. Rep. of Germany.
2414295 8/1979 France.

Primary Examiner—Billy J. Wilhite
Attorney, Agent, or Firm—Oblon, Fisher, Spivak, McClelland & Maier

[57] ABSTRACT

In a hay baler for producing rolled bales of the type having a shaping chamber in which the hay introduced in the form of a sheet is wound on itself around a horizontal axis (XX'), a tying mechanism has two distributors for ties which are mounted to swivel under the action of a control means to perform a reciprocating movement along the shaping chamber from a rest position near one end of the chamber to an end-of-tying position near the opposite end of the chamber. The distributors are mounted to rotate around an axis (Y) fixed to one of the side walls of the baler while the control means is fixed to the other side wall. An actuator with a reciprocating movement controlled by the control means first successively drives the distributors from the rest position to the end-of-tying position in the vicinity of which a severing means interrupts the ties, then returns the distributors to the rest position.

9 Claims, 10 Drawing Figures

TYING MECHANISM FOR ROLLED BALES IN A HAY BALER

BACKGROUND OF THE INVENTION

1. Field of the Invention

The invention relates to tying mechanism in a hay baler for producing rolled bales, of the type having a shaping chamber into which the hay introduced in the form of a sheet is wound on itself around a longitudinal axis. The tying mechanism has two distributors for twine. The distributors each have a tie output and are mounted to swivel under the action of control means to perform a reciprocating movement along the shaping chamber from a rest position near one end of the chamber to an end of tying position near the opposite end of the chamber.

2. Related Art

French patent publication No. A 2 457 636 describes a tying mechanism which has two twine distributors, each of which can be moved in a reciprocating movement and in which a control device moves these distributors in opposite directions so that the twines are interlaced. Two cutting knives cut the twine coming out of the distributors after the tying of the bale during the return of the distributors to their rest position.

This tying mechanism makes it possible to obtain a bale whose stability of shape allows unloading and handling operations.

SUMMARY OF THE INVENTION

The invention has as its object a tying mechanism in which the distributor arms for tying are easily accessible from the end of the shaping chamber and which assures a differential movement between said arms to form a double winding of the twine into ties around the bale with offset pitches.

Another object of the invention is a tying mechanism which makes it possible to wind two ties spirally around a cylindrical bale and which is operated by a control means fastened to the frame of the baler, of very simple design and of an inexpensive construction, which by means of a rotating control cam whose profile corresponds to the tying cycle permits the control of the length of the tie to correspond to the rotation speed of the cam.

According to the invention, the tie distributors are mounted to rotate around the same shaft fixed to one of the side walls of the baler while the control means is fixed to the other side wall of the baler. An actuator with a reciprocating movement servocontrolled by the control means first drives the distributors successively from the rest position to the end of tying position in the vicinity of which a severing means cuts the ties, then simultaneously returns the distributors to the rest position.

This tying mechanism provides a better distribution of the twine forming ties around the bale and offers the possibility of an overlapping of the ties at the ends of the bale without significantly changing the length of tie necessary to maintain its cohesion.

BRIEF DESCRIPTION OF THE DRAWINGS

Other characteristics and advantages of the invention will come out more clearly from the following description of an example of embodiment, made with reference to the accompanying drawing in which.

DETAILED DESCRIPTION OF THE PREFERRED EMBODIMENTS

Figure 1:
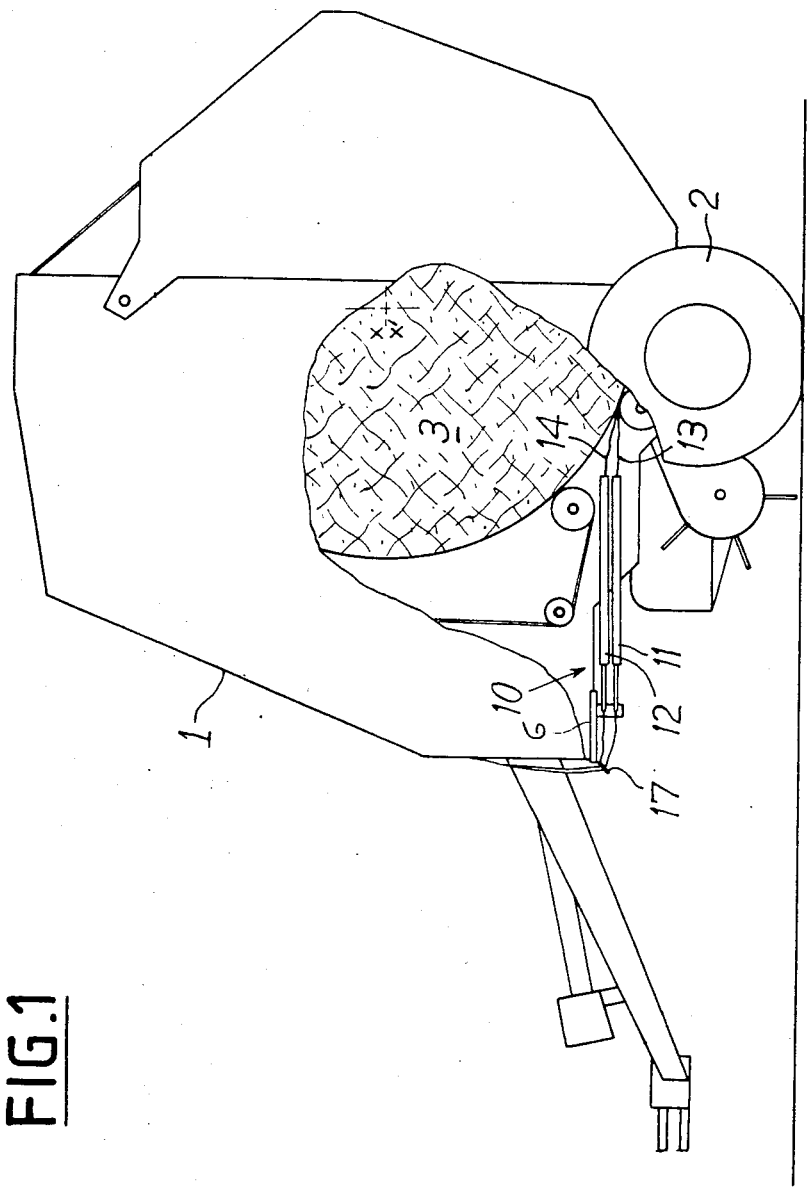
FIG. 1 is a side view of the baler from which a portion of the side wall has been removed to show a completed bale and the tying mechanism.

Referring particularly to FIG. 1, a hay baler generally known in the art and particularly a tractor-drawn machine as used in agriculture is shown with the tying mechanism of the invention attached thereto. The baler can be the hay baler illustrated by French patent publication No. A 2 460 099.

The baler has a frame 1 resting on the ground via wheels 2 and includes a shaping chamber 3 in which the hay introduced in the form of a sheet is supported on rollers and wound on itself around a horizontal axis XX'. A tying mechanism 10 is mounted on a support 6. For a detailed description of the conventional parts of the baler, reference can be made to said French patent publication No. A 2 460 099.

Frame 1 has essentially two side walls 4 and 5 which limit the transverse dimension of shaping chamber 3 and carry support 6 of tying mechanism 10 of the invention.

The tying mechanism, which is best seen in FIGS. 2 to 5, consists of two distributor tubes 11 and 12, each of which has a tie output for twines 13 and 14. The twines 13 and 14 come from separate feed sources, not shown, enter into tubes 11 and 12 at intake end 15 and exit them at output end 16. From there the twines enter the nip between the bale and one of its support rollers and are wound as ties around the bale as it rotates.

Figure 2:
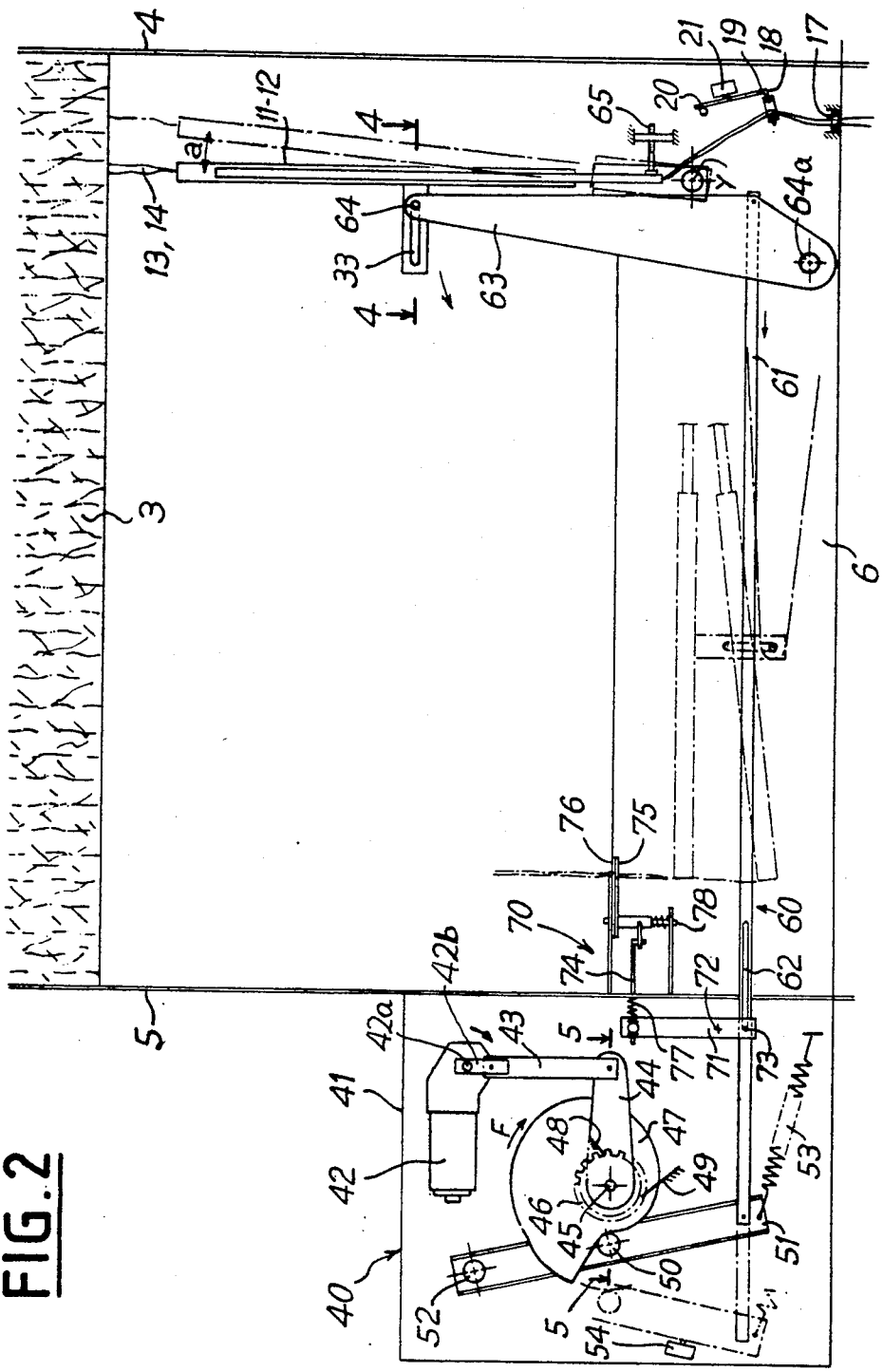
FIG. 2 is a plan view of the tying mechanism mounted on a hay baler in which the elements of the invention have been shown.
Figure 3:
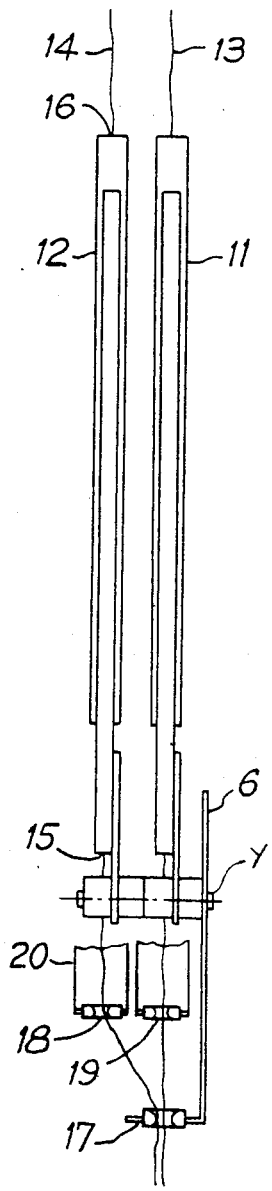
FIG. 3 is a side view of the tie distributors, fastened to the element frame.
Figure 4:
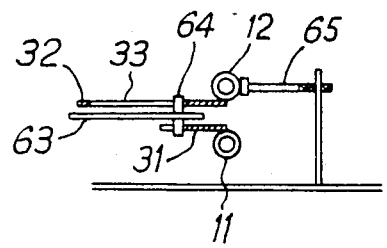
FIG. 4 is a detail view of the drive means of the distributors seen along line 4—4 of FIG. 2.

The path of the twine shown in FIG. 2 shows that this twine leaves the feed sources and is guided in a stationary guide 17 and mobile guides 18 and 19 mounted on support 6 as shown in FIGS. 2 and 3. Mobile guides 18 and 19 are each mounted on hinged arms 20 whose rest position is at a stop position defined on end-of-travel contactors 21. The contacts of the contactors 21 are open when the arm 20 are in a rest position and close when the arms of guides 18 and 19 separate from the contactors under the action of a pulling force exerted on twines 13 and 14. For this purpose, distributors 11 and 12 are mounted to rotate around an axis Y fixed to the side wall of support 6.

Next the control means for the distributor tubes, the control means being fastened to the other side wall, 5 will be described.

Figure 5:
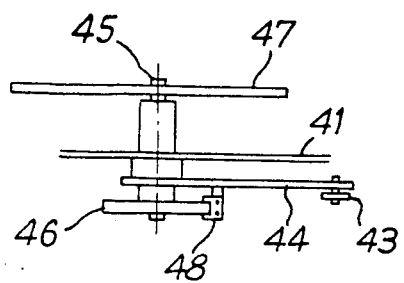
FIG. 5 is a view in section of the drive system of the programming cam seen along line 5—5 of FIG. 2.

As is shown in FIGS. 2 and 5, control means 40 is included in a support casing 41 fastened to wall 5. Casing 41 contains a drive element which can, by way of example, consist of an electric gearmotor 42.

The output shaft 42a of gearmotor 42 drives in rotation an intermediate piece 42b which is pivotally connected to a connecting rod 43 whose length is adjustable by any known means. The end of connecting rod 43 is pivotally connected to a crank 44 mounted to rotate around a rotating shaft 45 mounted on casing-support 41. A gear wheel 46 and a programming cam 47 are rigidly mounted on shaft 45. A drive system fixed to crank 44 consists of a pawl 48 engaged on the teeth of wheel 46. A ratchet element 49 hinged on casing 41 limits the rotation of gear wheel 46 and programming cam 47 to the direction defined by arrow F. Therefore, rotation of output shaft 42a rotates intermediate piece 42b which causes connecting rod 43 to reciprocate. Each reciprocation of connecting rod 43 causes crank 44 to rotate wheel 46 by one or more teeth, the exact number depending upon the length of the intermediate piece 42b. The rotation of wheel 46 in turn rotates cam 47 which is rotatable therewith.

The profile of programming cam 47 rests against a cam follower or drive element 50 carried by a control connecting rod 51. Control connecting rod 51 is hinged on a shaft 52 carried by casing 41. The end of connecting rod 51 opposite shaft 52 carries the anchoring of a return spring 53 mounted in tension between connecting rod 51 and casing 41. Moreover, an end of travel contactor 54 is located in the path of connecting rod 51 at the end of its travel when the drive element 50 reaches the top of the profile of programming cam 47. The end of connecting rod 51 also carries the hinge pin of an actuator 60 which will be described below.

Actuator 60 consists of a control bar 61 which extends from casing 41, through wall 5, and across shaping chamber 3. Control bar 61 has a power take-off that can be disengaged and which consist of a longitudinal slot 62 in which a control pin of severing means 70 fastened to wall 5 moves. The end of control bar 61 is pivotally fastened to a lever arm 63 hinged around a stationary vertical shaft 64a carried by support 6 of the tying mechanism. The end of lever arm 63 carries a drive pin 64 for distributors 11 and 12.

For this purpose, the tube of distributor 11 carries a drive stop 31 which is pivotally mounted to pin 64. The tube of distributor 12 carries a drive stop 32, this latter being pierced with a slot 33 in which drive pin 64 is slidably engaged. This arrangement makes possible the driving of distributor tube 11 by the pin 64 while distributor tube 12 remains temporarily on a stop 65 adjustably fixed to support 6.

Severing means 70 consists of a control arm 71 mounted to rotate around a vertical shaft 72 fastened to support 6 and whose end carries control pin 73 movable in slot 62 of control bar 61. Control arm 71 is connected to a control rod 74 of a mobile knife 75.

Mobile knife 75 is mounted to rotate around a horizontal shaft 78 which is fixed in relation to stationary knife 76. A spring 77 mounted in compression between control arm 71 and wall 5 surrounds rod 74 and biases knife 75 to a position where it is separate from knife 76.

The rotation speed of programming cam 47, which can be adjusted as a function of the length of intermediate piece 42b, determines the speed of movement of control bar 61. The rotation speed of cam 47 could be adjusted by other means such as an electric or hydraulic variator. The rotation of cam 47 moves control connecting rod 51 and control bar 61.

Figure 6:
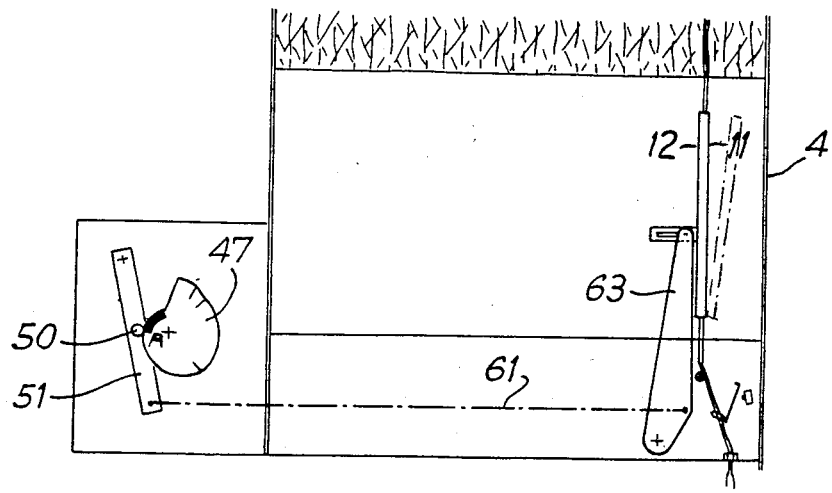
FIGS. 6 to 9 diagrammatically show the successive position of the tying device during the process of winding and severing of the tie.

The beginning position of distributor tubes 11 and 12 (FIG. 6) is achieved by a rotation of programming cam 47, as a result of which part A of the cam profile moves drive element 50 while increasing the tension of return spring 53 of connecting rod 51.

The initial position of distributors 11 and 12 can be either parallel to wall 4 or have an initial angular offset "a" between the distributors as shown in dot-and-dash lines. For this purpose, the stop means 65 makes it possible to adjustably set the selected position.

Figure 7:
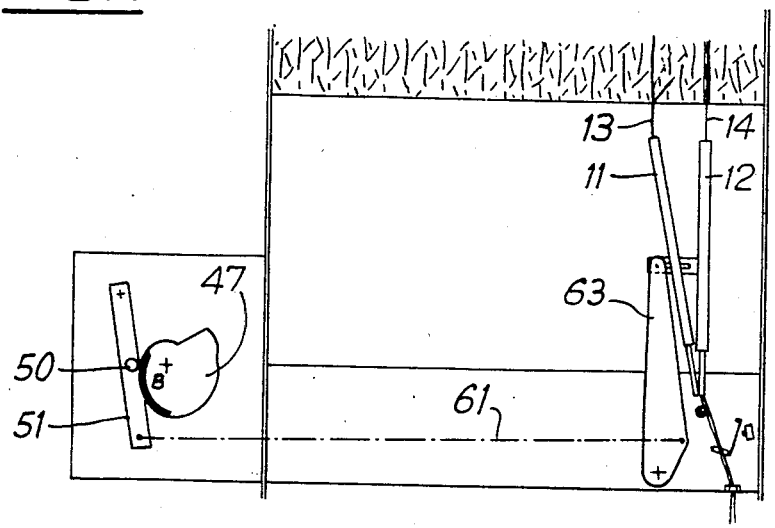

The rotation of the bale in chamber 3 takes up twines 13 and 14 which are wound in one or two longitudinally staggered turns. The tension on the twine thus created exerts a crosswise force on movable guides 18 and 19, and arms 20. The separation of arms 20 from end-of-travel contactors 21 initiates the start of the tying cycle (FIG. 7) via an electric control system which is not shown.

Lever arm 63, by pin 64, moves the tube of distributor 11. However the movement of distributor 12 is delayed by the length of slot 33. Twine 13 coming out of pipe 11 can then cross twine 14 coming out of distributor tube 12 and makes possible the immobilization of twine 14.

As distributor 11 moves, twine 13 coming out of tube 11 begins its winding movement around the bale, while twine 14 from stationary distributor 12 is wound around the bale in a stationary plane for a time $t_0 = l/v$, where $l$ is the length of hole 33 and $v$ the speed of linear movement of drive pin 64.

Part B of the profile of the programming cam (FIG. 7) then further moves drive element 50 and connecting rod 51. The resultant movements of the control bar and of lever arm 63 simultaneously move the assembly of distributor tubes 11 and 12. During this movement, twines 13 and 14 continue to be wound around the bale in a double spiral, with the spiral which is produced by twine 14 overlapping the spiral produced by twine 13 to achieve a better hold of twines 13 and 14 and a reduction of tying time.

Figure 8A:
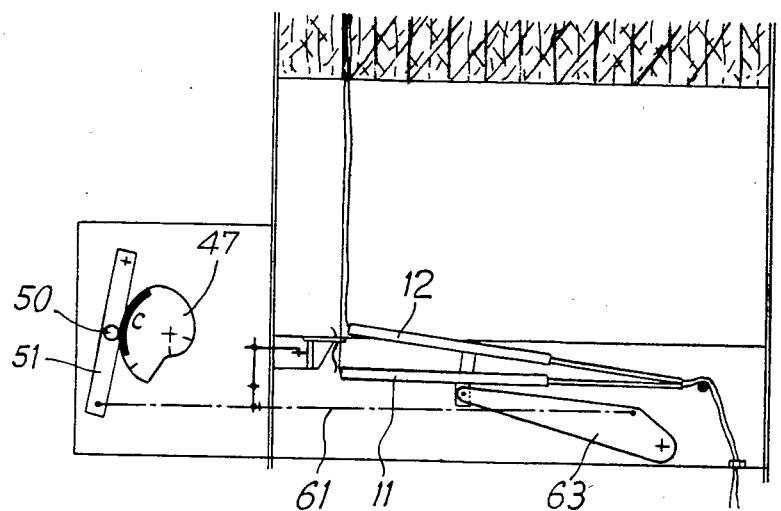
Figure 8B:
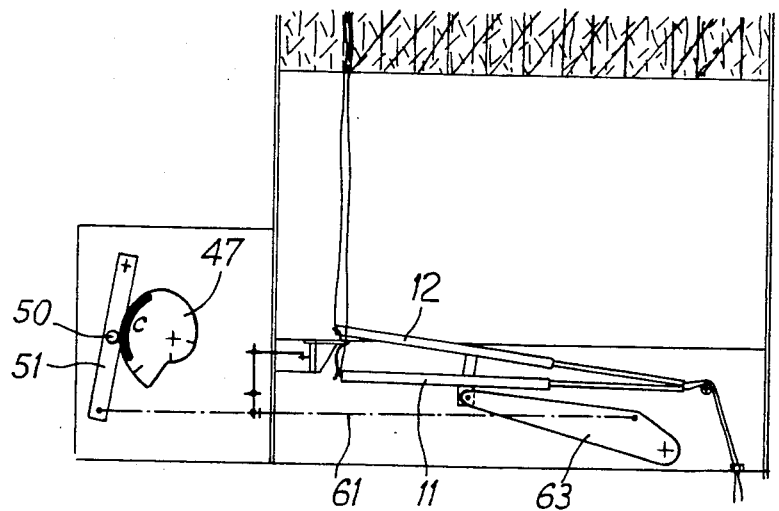

Part C of the profile of programming cam 47 is concentric to its axis of rotation 45 (FIGS. 8a and 8b). Part C of the profile of the cam therefore makes it possible to hold drive element 50 in position at the end-of-travel of distributors 11 and 12, which twine 13 and 14 can occupy the same longitudinal position on the bale (FIG. 8a) or crossed positions in which twine 14 immobilizes twine 13 (FIG. 8b). In this position, twines 13 and 14 are near mobile knife 75 of severing means 70. The assembly of twines 13 and 14 are wound for a predetermined time in the same plane of a bale during the period of the passage of part C of the profile in front of drive element 50. This phase of the process assures a proper hold of the tie on the bale.

Figure 9:
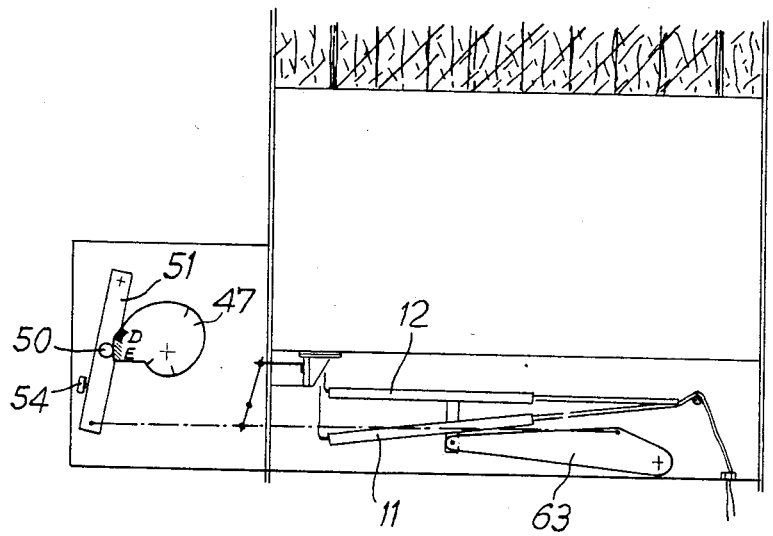

Part D of the profile of programming cam 47 allows a further movement of distributors 11 and 12 (FIG. 9) and puts the twines 13 and 14 between knives 75 and 76. Control bar 61, during its movement by part D drives control pin 73 and the resultant movement of arm 71 actuates mobile knife 75 to cut the twines 13 and 14.

Part E of the profile of programming cam 47 allows a further movement of distributors 11 and 12 (FIG. 9) until connecting rod 51 actuates end-of-travel contactor 54 which stops gearmotor 42. Following this stop, the bale thus tied is ejected from the baler.

Restarting of gearmotor 42 is performed manually or automatically from the control station of the baler when the following bale is complete and when it is ready to be tied.

The top of the profile of the programming cam then passes in front of drive element 50 and the drive element 50 returns to its previously described starting position on part A of the profile. Return spring 53 simultaneously moves connecting rod 51 which causes distributors 11 and 12 to quickly return to their initial position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a hay baler having means for producing hay bales wound around a horizontal first axis, a tying mechanism comprising:
   first and second elongated distributors, each having one end pivotally mounted to said baler about a vertical second axis at one end of said baler in the direction of said first axis and each having a second end, said distributors being pivotable about said second axis to a rest position wherein the lengths of said distributors extend substantially tranverse to said first axis, said distributors also being pivotable about said second axis to a tying position, wherein said lengths of said distributors are substantially parallel to said first axis;
   means for delivering twine to said first and second distributors, said twine being discharged from said second ends of said distributors to said bales for tying said bales;
   actuator means controllable for pivoting said distributors about said second axis;
   means connecting said actuator means to said distributors such that said distributors are caused to pivot together, said connecting means including means for causing one of said distributors to initate pivoting from said rest position before the other of said distributors;
   control means at another end of said baler in said direction of said first axis for controlling said actuator means such said distributors reciprocate between said rest position and said tying position; and
   severing means positioned for severing said twine when said distributors are in said tying position.

2. The hay baler of claim 1 wherein said control means comprises:
   a programming cam rotatable about a third axis fixed to said frame;
   means for intermittently rotating said cam in a single direction;
   a lever pivoted about a fourth axis fixed to said baler and having a cam follower engagable with a cam profile of said cam, said actuator means being connected to a portion of said lever opposite said fourth axis; and
   spring means for biasing said cam follower into engagement with said cam profile, whereby rotation of said cam causes said distributors to reciprocate between said rest position and said tying position.

3. The hay baler of claim 2 wherein said means for intermittently rotating said cam comprise:
   a gear wheel fixed to said cam for rotation therewith;
   a crank rotatable about said third axis;
   means for reciprocating said crank; and
   rachet and pawl drive means for transfering said crank reciprocation in one direction to said gear wheel.

4. The hay baler of claim 1 wherein said connecting means comprise:
   a lever arm having one end pivotable about a vertical axis; said actuator means being connected to said lever arm for pivoting said lever arm;
   means for connecting said lever arm to said one of said distributors;
   pin and slot means for connecting said lever arm to said other of said distributors with a degree of play in a direction of pivoting movement of said distributors.

5. The hay baler of claim 2 wherein said connecting means comprise:
   a lever arm having one end pivotable about a vertical axis; said actuator means being connected to said lever arm for pivoting said lever arm;
   means for connecting said lever arm to said one of said distributors;
   pin and slot means for connecting said lever arm to said other of said distributors with a degree of play in a direction of pivoting movement of said distributors.

6. The hay baler of claim 3 wherein said connecting means comprise:
   a lever arm having one end pivotable about a vertical axis; said actuator means being pivotally connected to said lever arm for pivoting said lever arm;
   means for connecting said lever arm to said one of said distributors;
   pin and slot means for connecting said lever arm to said other of said distributors with a degree of play in a direction of pivoting movement of said distributors.

7. The hay baler of claim 1 wherein said actuator means includes means for actuating said severing means.

8. The hay baler of claim 2 wherein said actuator means includes means for actuating said severing means.

9. The hay baler of claim 4 wherein said actuator means includes means for actuating said severing means.

* * * * *